United States Patent [19]
Monteleone et al.

[11] Patent Number: 5,904,414
[45] Date of Patent: May 18, 1999

[54] FLASHLIGHT WITH GAS PERMEABLE MEMBRANE AND BATTERY POLARIZATION

[75] Inventors: William J. Monteleone, San Clemente; Alan K. Uke, Del Mar; Elmer F. Fischer, San Diego, all of Calif.

[73] Assignee: Underwater Kinetics, San Marcos, Calif.

[21] Appl. No.: 08/822,307

[22] Filed: Mar. 21, 1997

[51] Int. Cl.⁶ .................................. F21L 7/00; F21L 9/00; F21L 11/00
[52] U.S. Cl. .......................... 362/205; 362/202; 362/203; 362/204; 362/208
[58] Field of Search ..................................... 362/202, 203, 362/204, 205, 206, 208

[56] References Cited

U.S. PATENT DOCUMENTS

| | | | |
|---|---|---|---|
| 3,980,388 | 9/1976 | Nailor, III | 339/228 |
| 4,024,953 | 5/1977 | Nailor, III | 206/344 |
| 4,133,130 | 1/1979 | Young, Jr. | 43/17 |
| 4,237,526 | 12/1980 | Wood | 362/158 |
| 4,433,365 | 2/1984 | Rousseau | 362/189 |
| 5,161,879 | 11/1992 | McDermott | 362/206 |
| 5,349,507 | 9/1994 | Parker | 362/158 |
| 5,404,281 | 4/1995 | Parker | 362/208 |
| 5,410,237 | 4/1995 | Sharrah et al. | 320/2 |
| 5,473,521 | 12/1995 | Minshall | 362/205 |
| 5,590,951 | 1/1997 | Matthews | 362/205 |

*Primary Examiner*—Sandra O'Shea
*Assistant Examiner*—Michael J. Smith
*Attorney, Agent, or Firm*—Michael H. Jester

[57] ABSTRACT

A flashlight that includes a substantially watertight battery housing, a bulb mounted in a socket assembly, a reflector, and a lens covering a forward end of the reflector. A plurality of batteries are supported in the housing so that only if the batteries are correctly polarized will a circuit be completed to allow current from the batteries to energize the bulb. This reduces the emission of flammable gas or corrosive liquid from the batteries. A membrane seals a vent port in the battery housing and is made of a material that permits a flammable gas generated by the batteries within the housing to continuously escape from the housing through the membrane without permitting water to enter the housing through the membrane. Pellets are mounted inside the battery housing for neutralizing the effects of any flammable gas emitted within the battery housing that may have nevertheless been produced and not adequately vented.

18 Claims, 13 Drawing Sheets

FLASHLIGHT WITH GAS PERMEABLE MEMBRANE AND BATTERY POLARIZATION

BACKGROUND OF THE INVENTION

The present invention relates to hand held battery powered electronic and electrical devices, and more particularly, to flashlights designed to prevent explosions due to outgassing of flammable gases from batteries.

In order to make alkaline batteries less hazardous to the environment, Mercury is no longer used as a constituent thereof. However, this leads to increased outgassing of hydrogen gas, especially when multiple batteries are inserted into a flashlight or other portable or electrical device without the proper positive-to-negative terminal orientation required, i.e. correct polarization.

Many flashlights have substantially watertight, and therefore substantially gas impervious battery housings so that they will still function if submerged in water. There have been instances where such flashlights have exploded due to the build-up of hydrogen gas therein. Such explosions not only risk personal injury, but can also be catastrophic where a fireman is inspecting a building with a propane leak, or a worker is inspecting a grain silo, for example. An entire building or silo can explode, killing individuals and inflicting staggering property losses. Apart from the hazard of explosion, incorrect battery polarization can cause alkaline batteries to leak potassium hydroxide. This chemical can seriously corrode terminals and other contacts within a flashlight, rendering it non-functional.

Attempts have been made in the past to address the danger of hydrogen gas emission inside substantially airtight flashlights. Pellets have been installed into the lamp module of a flashlight as disclosed in U.S. Pat. No. 5,404,281 of Parker to absorb or otherwise render harmless any hydrogen gas expelled by the batteries. Such pellets may include Aluminum Oxide and Platinum which acts as a catalyst so that water vapor is produced. The problem with such pellets is that they degrade over time so their ability to neutralize the hydrogen gas emitted by the batteries may be insufficient. Another approach to dealing with the hydrogen gas emitted by flashlight batteries is disclosed in U.S. Pat. No. 5,349,507 of Parker wherein a pressure release valve is incorporated into the battery housing to vent hydrogen gas. The construction of the valve includes a coil spring and a sealing plate and it requires a minimum pressure of at least two and one-half pounds per square inch relative to the ambient air before the hydrogen gas will vent. Clearly accumulated hydrogen gas within the battery housing having a pressure below this amount could still ignite based on the oxygen within the housing, causing an explosion.

SUMMARY OF THE INVENTION

Accordingly, it is the primary object of the present invention to provide an improved flashlight.

It is another object of the present invention to provide a flashlight with a substantially watertight battery housing with an improved construction for eliminating dangerous hydrogen or other flammable gas expelled by the batteries.

It is another object of the present invention to provide an improved flashlight in which the batteries must be properly polarized in order to complete the circuit that allows the bulb to be energized, thereby reducing the possibility of the emission of corrosive chemicals or flammable gases by the batteries.

The present invention provides a flashlight that includes a substantially watertight battery housing, a bulb mounted in a socket assembly with a reflector and a lens covering a forward end of the reflector. A plurality of batteries are supported in the housing so that only if the batteries are correctly polarized will a circuit be completed to allow current from the batteries to energize the bulb. This reduces the emission of flammable gas or corrosive liquid from the batteries.

Another aspect of the invention is to provide a flashlight with a battery housing having a membrane sealing a vent port in the battery housing. The membrane is made of a material that permits a flammable gas generated by the batteries within the housing to continuously escape from the housing under very low pressures through the membrane without permitting water to enter the housing through the membrane.

A still further aspect of the invention is to provide a flashlight having both the battery polarization and hydrogen venting features described above.

A still further aspect of the invention is to provide a flashlight having one or both of the features described above along with at least one pellet for neutralizing the effects of any flammable gas emitted within the battery housing that may have been produced and not adequately vented.

DETAILED DESCRIPTION OF THE PREFERRED EMBODIMENTS

Figure 1:
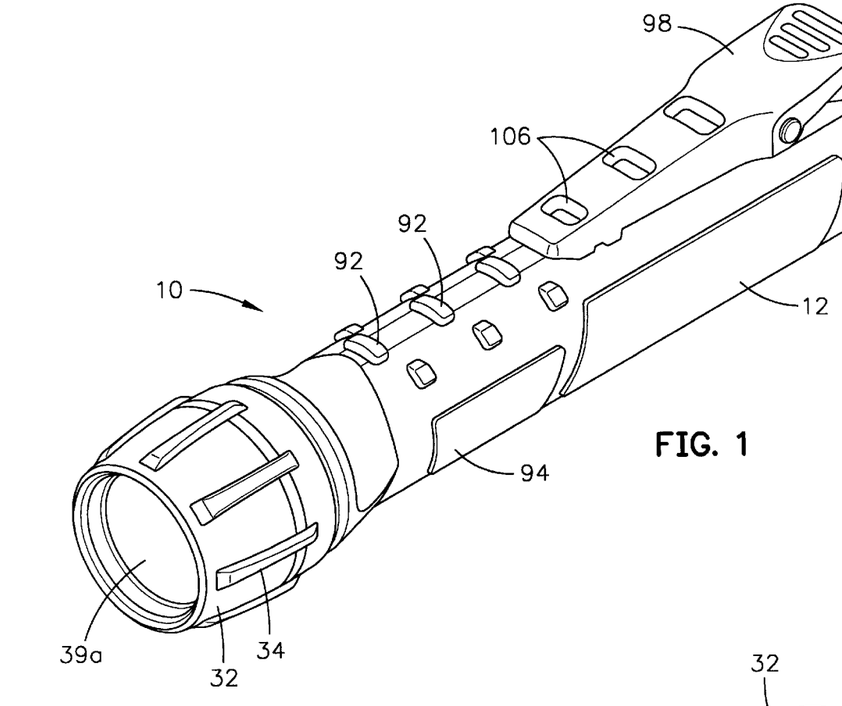
FIG. 1 is an isometric view of a flashlight incorporating a preferred embodiment of the present invention taken from the front end of the flashlight.
Figure 2:
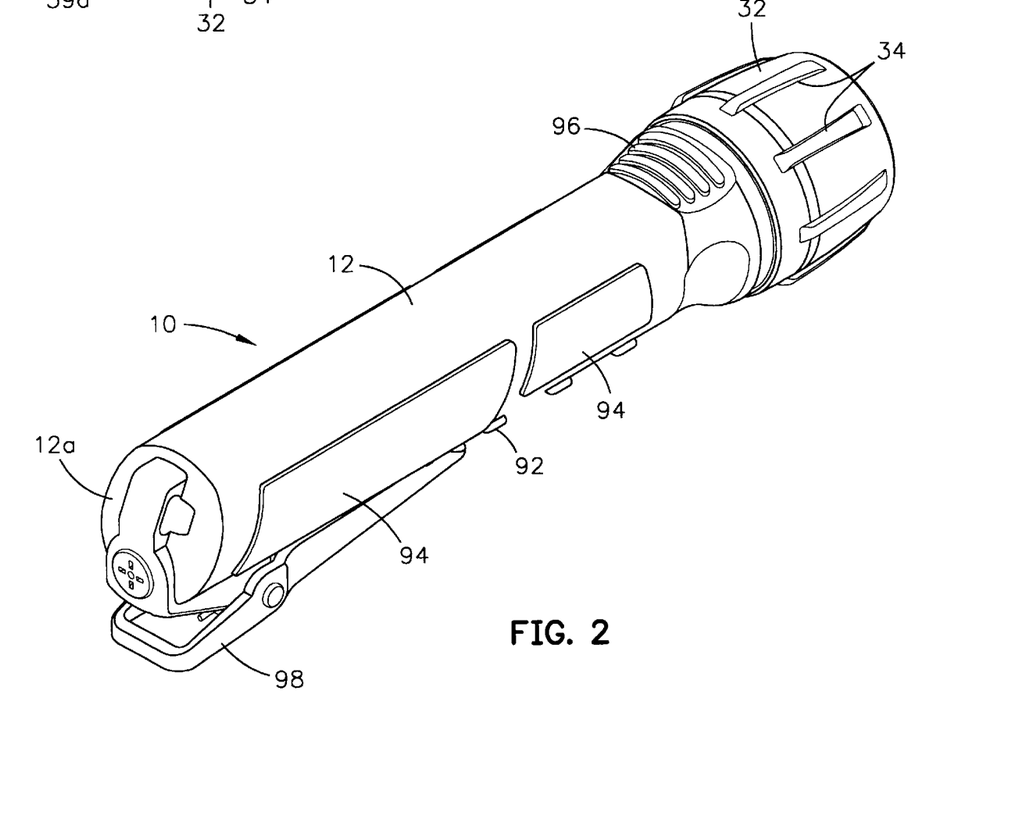
FIG. 2 is an isometric view of the flashlight of FIG. 1 taken from the rear end of the flashlight.
Figure 3:
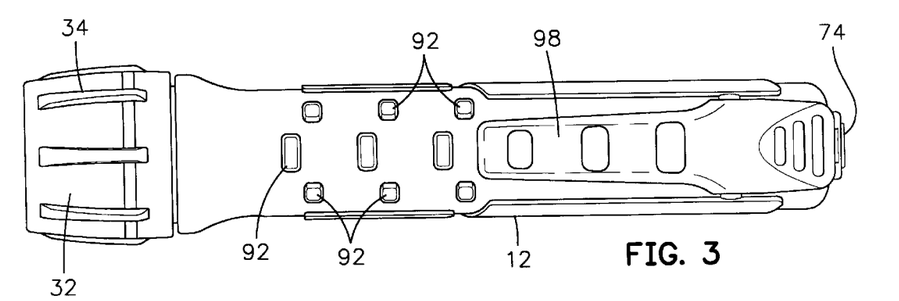
FIG. 3 is a top plan view of the flashlight of FIG. 1.
Figure 4:
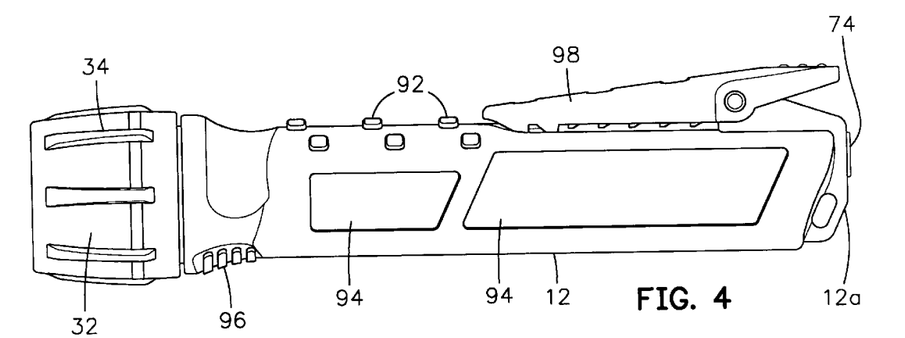
FIG. 4 side elevation view of the flashlight of FIG. 1.
Figure 5:
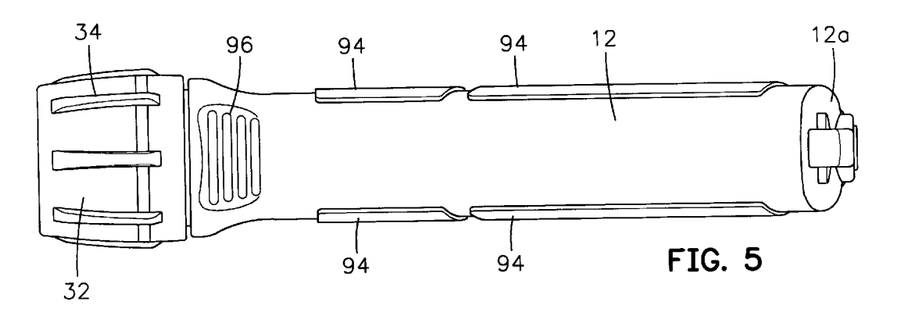
FIG. 5 is a bottom plan view of the flashlight of FIG. 1.
Figure 6:
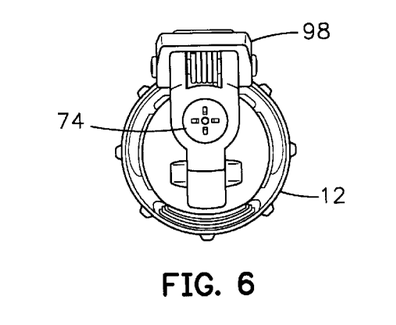
FIG. 6 is a rear end elevation view of the flashlight of FIG. 1.

Unless otherwise indicated, the structural parts of the flashlights described hereafter are made of injection molded plastic. The springs and conductive contact members can be made of beryllium copper, stainless steel or phosphor bronze. Referring to FIGS. 1 and 2, a flashlight 10 incorporating a preferred embodiment of the present invention includes a substantially watertight battery housing 12. The battery housing 12 is generally elongate and cylindrical in configuration and is dimensioned for accommodating three standard C cell batteries 14, 16 and 18 (FIG. 7) in end-to-end relationship. Its cross-section is very slightly triangular for a better ergonomic feel. The battery housing 12 has a closed rearward end 12a (FIG. 2) and an open forward end 12b (FIG. 8). The batteries 14, 16 and 18 are inserted into a battery carriage 20 that may be completely slid into the battery housing 12 through the open forward end 12b thereof.

Figure 7:
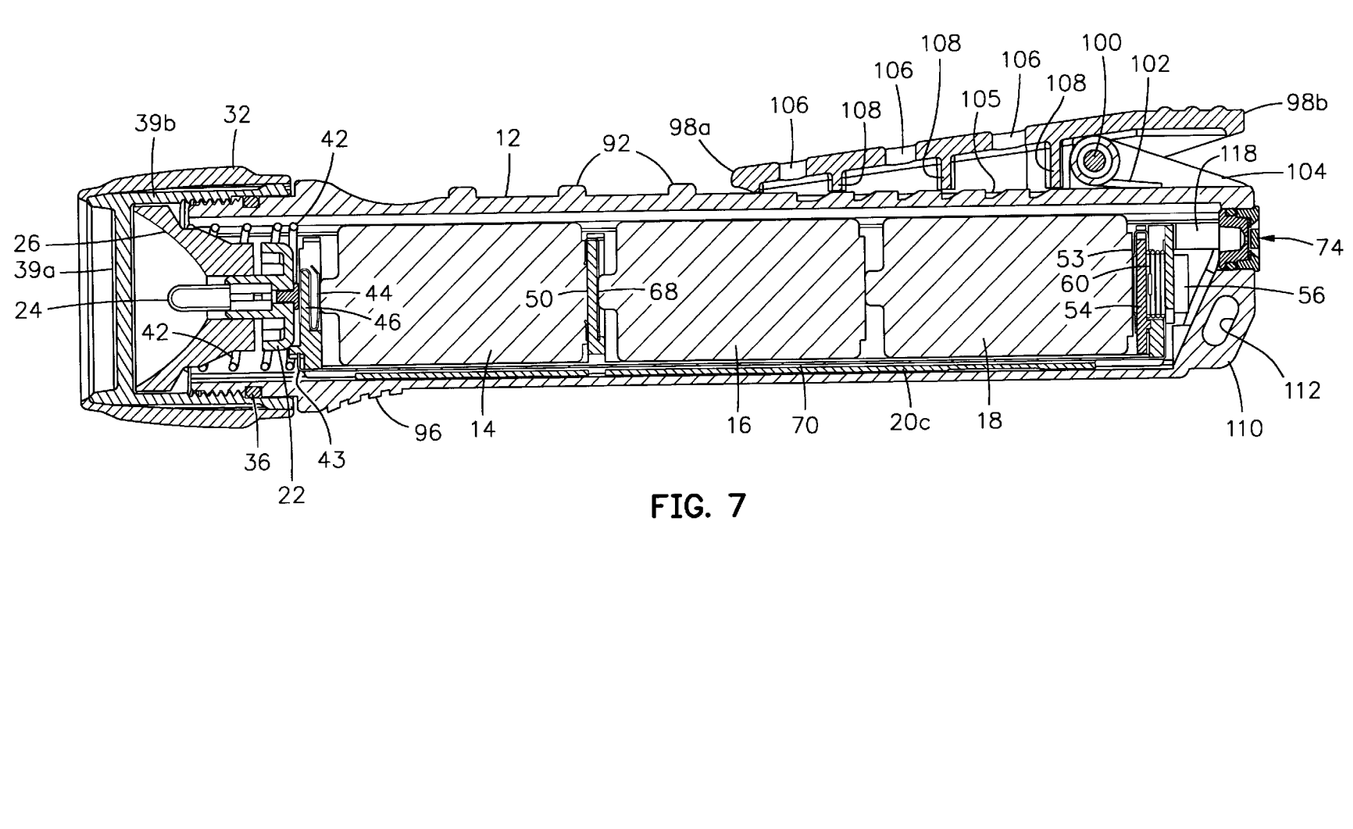
FIG. 7 is an enlarged longitudinal sectional view of the flashlight of FIG. 1.
Figure 8:
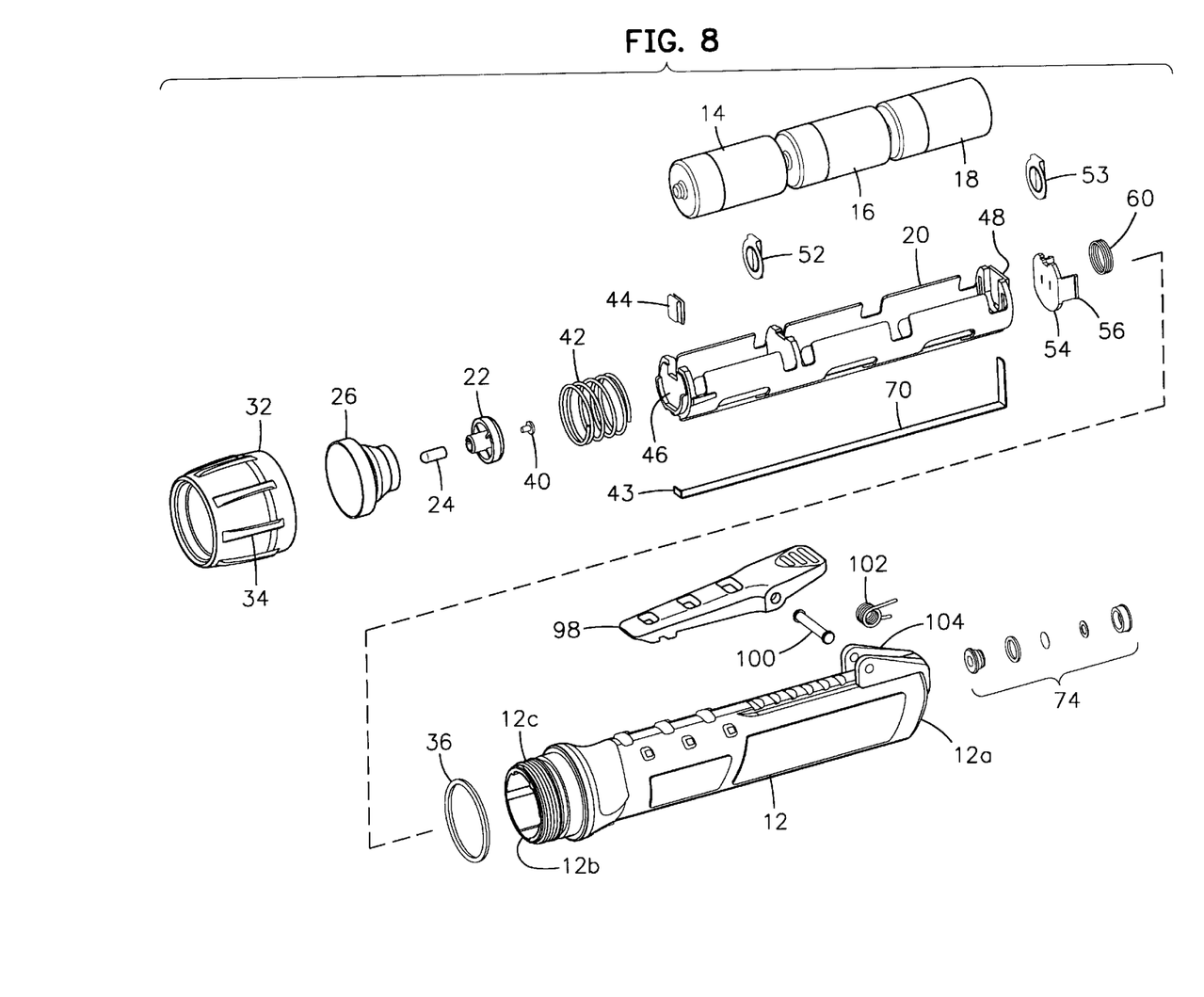
FIG. 8 is an exploded isometric view of the flashlight of FIG. 1.
Figure 19:
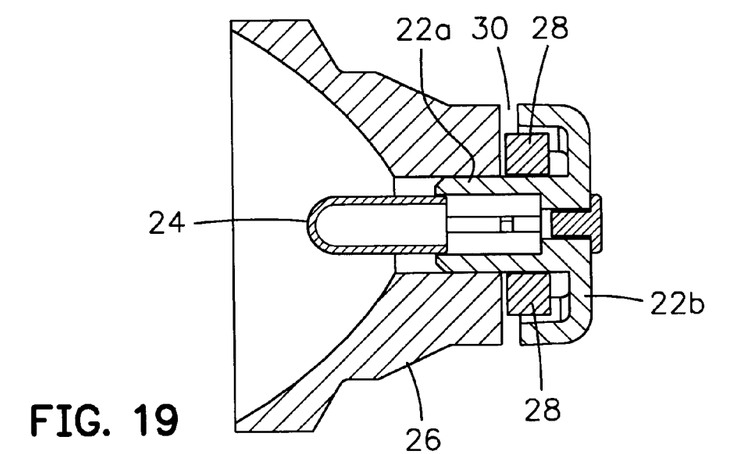
FIG. 19 is a sectional view taken along line 19—19 of FIG. 18 illustrating further details of the bulb, socket, catalyst pellets and reflector of the flashlight of FIG. 1.
Figure 20:
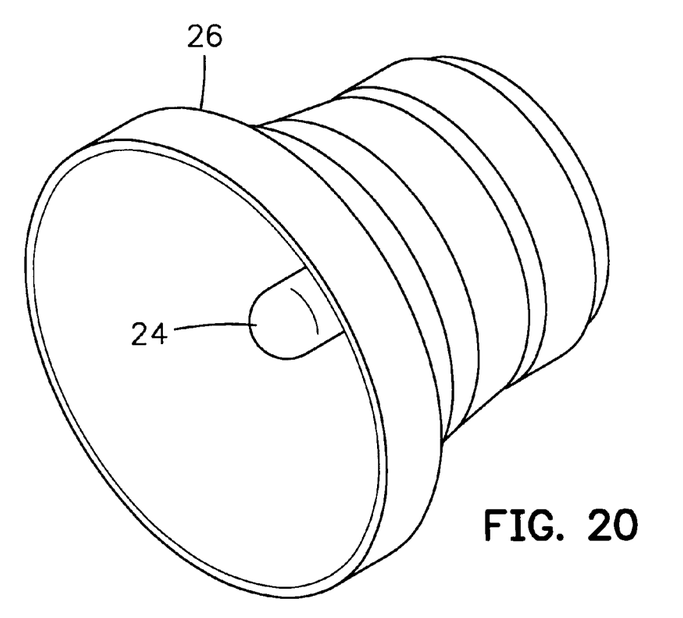
FIG. 20 is an isometric view of the reflector and bulb of the flashlight of FIG. 1.

The open forward end 12b of the battery housing 12 receives a socket assembly 22 (FIGS. 7 and 8). A bulb 24 is mounted in the socket assembly 22. A reflector 26 (FIGS. 8 and 18–20) has a central bore through which the bulb 24 extends. A cylindrical portion 22a (FIG. 19) of the socket assembly 22 is snugly received in the central bore of the reflector 26. The 26 surrounds the bulb 24 and directs light therefrom forwardly. The reflector 26 is preferably metal such as Aluminum so that it also helps dissipate heat from the bulb 24.

The socket assembly 22 also includes a disk shaped insulator portion 22b (FIG. 19) having recesses for snugly receiving a pair of catalyst pellets 28 (FIG. 19) that facilitate the conversion of hydrogen and ambient air inside the battery housing 12 into water. The annular space 30 between the base of the reflector 26 and the insulator portion 22b of the socket assembly 22 may be partially filled with a potting compound in a manner that still allows the pellets 28 to interact with any hydrogen give off by the batteries within the housing 12. Alternatively a catalyst disk (not illustrated) can be mounted in the annular space 30 (FIG. 17) in lieu of the pellets 28.

Figures 13, 14:
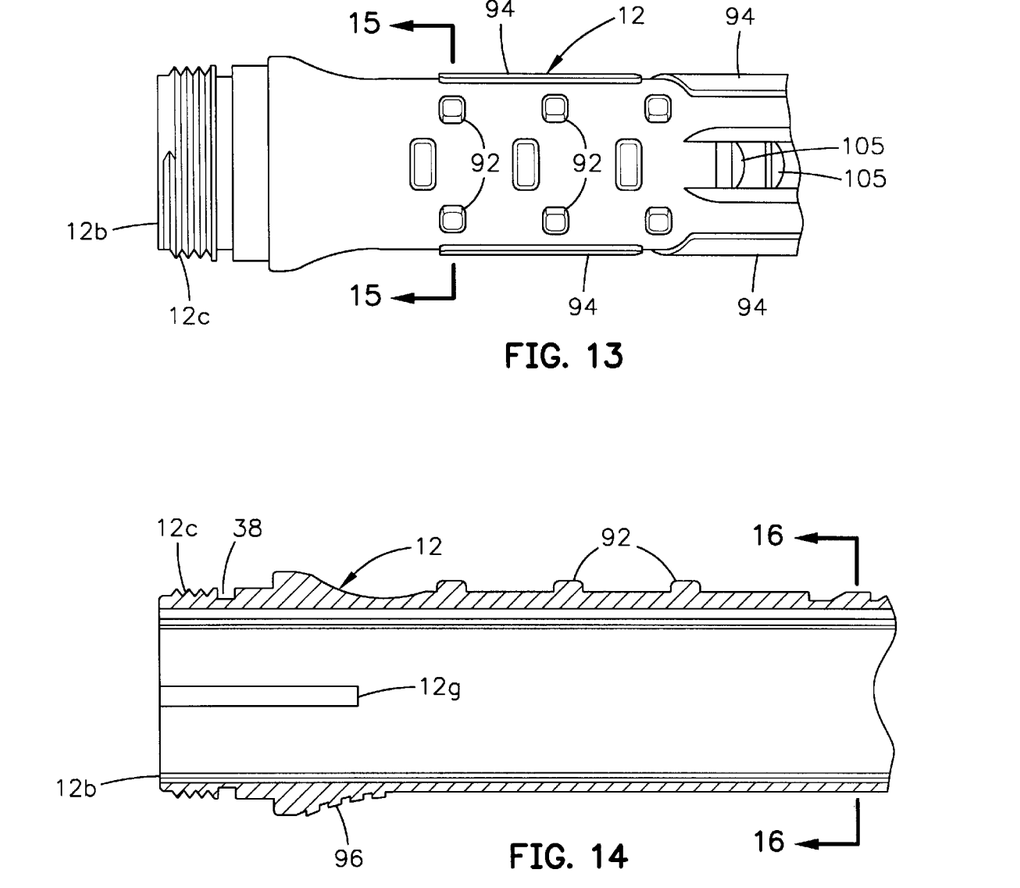
FIG. 13 is an enlarged fragmentary top plan view of the forward portion of the flashlight of FIG. 1.
FIG. 14 is an enlarged fragmentary longitudinal sectional view of the forward portion of the battery housing of the flashlight of FIG. 1.
Figure 17:
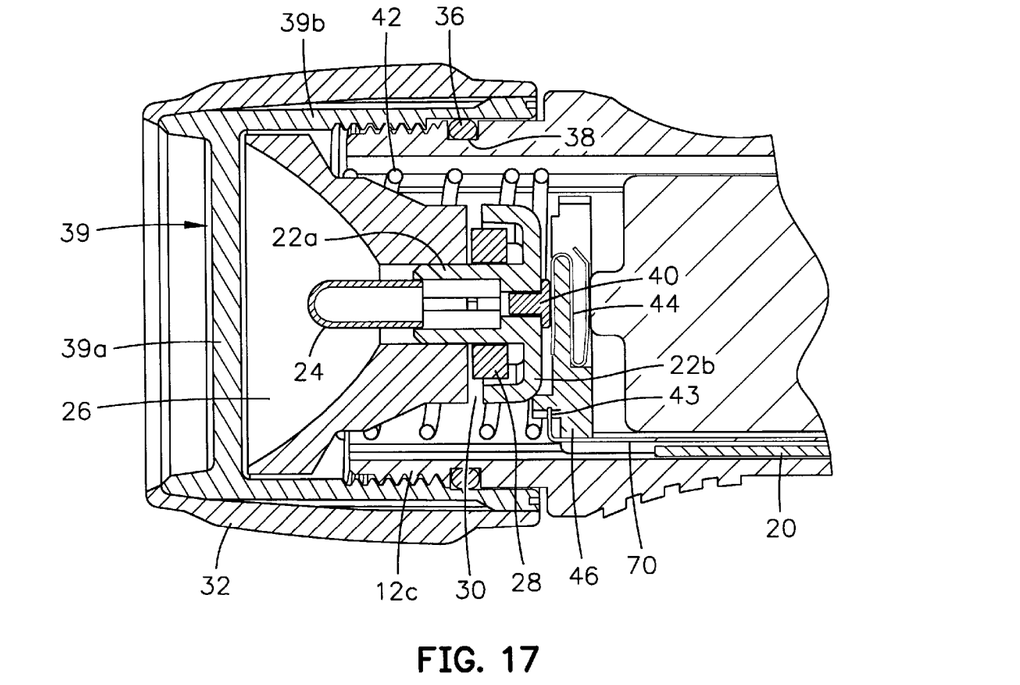
FIG. 17 is an enlarged fragmentary longitudinal sectional view of the forward portion of the flashlight of FIG. 1 illustrating details of its bulb, socket, reflector, lens and barrel.
Figure 18:
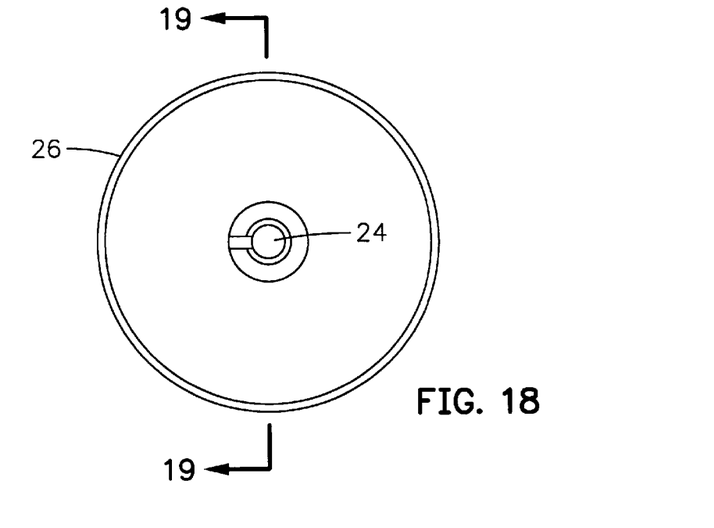
FIG. 18 is a front elevation view of the bulb and reflector of the flashlight of FIG. 1.

The battery housing 12 has a forward cylindrical neck 12c (FIGS. 8 and 17). The forward portion of the neck 12 has threads on the exterior thereof. A matching internally threaded cylindrical barrel 32 is twistable and screwable over the neck 12c. The barrel 32 surrounds and supports the socket assembly 22, bulb 24 and reflector 26. The barrel 32 has a plurality of axially extending, circumferentially spaced ribs 34 (FIGS. 1 and 2) formed on the external surface thereof. An elastomeric O-ring 36 (FIGS. 8 and 17) is seated in an annular groove 38 (FIG. 14) formed in the neck 12c.

A clear lens assembly 39 (FIG. 17) including a transverse window portion 39a and a cylindrical portion 39b is press fit inside the barrel 32. The O-ring 36 is engaged by the cylindrical portion 39b of the lens assembly and deformed by the same when the barrel 32 is screwed down over the neck 12c. This provides a watertight seal that prevents water from entering the battery housing 12 if the flashlight 10 is inadvertently submerged.

A metal rivet 40 (FIG. 17) is inserted into a hole in the center of the insulator portion 22b of the socket assembly 22. The metal rivet 40 is electrically connected to one terminal of the bulb 24 via a lead which is not illustrated in the drawings. A large coil spring 42 (FIGS. 8 and 17) is compressed between the rear of the reflector 26 and the forward end of the battery carriage 20. The spring 42 makes an electrical contact between a conductive member 43 (FIG. 17) on the forward end of the battery carriage 20 and a peripheral rear shoulder 26a (FIG. 19) of the metal reflector 26. Another lead also not illustrated connects the reflector 26 with the other terminal of the bulb 24 which is not connected to the rivet 40. The barrel 32 may be screwed and unscrewed over the neck 12c of the battery housing so that the rivet 40 makes and breaks electrical contact with a positive conductive contact member 44 (FIG. 17) attached to a forward endwall 46 of the battery carriage 20. This arrangement provides an ON/OFF switch in the electrical circuit comprised of the three C batteries 14, 16 and 18, the conductive contact members in the battery carriage 20 (hereafter described in detail), the bulb 24, the coil rivet 40, the coil spring 42 and the two separate leads that connect the rivet 40 and reflector 26 to the corresponding terminals of the bulb 24.

The battery carriage 20 is specially constructed so that only if the C batteries 14, 16 and 18 are all correctly polarized will a circuit be completed to allow current from the batteries to energize the bulb 24. This will prevent the batteries from being rapidly drained stored energy. More importantly, correct polarization of the batteries will reduce or eliminate the emission of corrosive chemicals from the batteries and the exhausting of combustible gas such as hydrogen that could lead to an explosion.

FIGS. 12A–12K are a series of isometric, elevation and end views showing all sides of the battery carriage 12 of the flashlight 10. The battery carriage 20 has a generally cylindrical or tubular configuration with approximately one-third of the circumference open. Recesses 20a facilitate outward bending of the cylindrical side walls of the battery carriage 20 to permit the C cell batteries to be readily installed and removed therefrom. The resilience of the plastic allows easy insertion and removal of the batteries 14, 16 and 18. The battery carriage 20 is formed with two parallel rows of three rectangular apertures 20b in its side walls. The apertures 20b allow a user to push on the batteries to aid in their removal from the carriage 20.

The battery carriage 20 is formed with opposite end walls 46 and 48 (FIGS. 12A–12K) and an intermediate divider 50. The divider 50 separates the interior compartment of the battery carriage 20 into two sub-compartments. The first sub-compartment at the forward end of the battery carriage 20 is dimensioned to hold the single C cell battery 14. The second sub-compartment comprising roughly the latter two-thirds of the length of the carriage 20 is dimensioned to hold the two C cell batteries 16 and 18 in end-to-end relationship.

The carriage 20 includes two negative conductive contact members 52 and 53 (FIGS. 12D and 12E) that are configured so that they will not make electrical contact with a positive terminal of any of the plurality of C cell batteries when they are fully inserted into the carriage 20. They are formed as ring-shaped elements that will lie in substantially co-planar engagement with an adjacent negative terminal of one of the batteries. Each ring-shaped element that acts as a negative contact member will receive through its central hole the positive raised terminal of a C cell battery without making electrical contact with the same if the battery is installed in an incorrect orientation.

Figure 9:
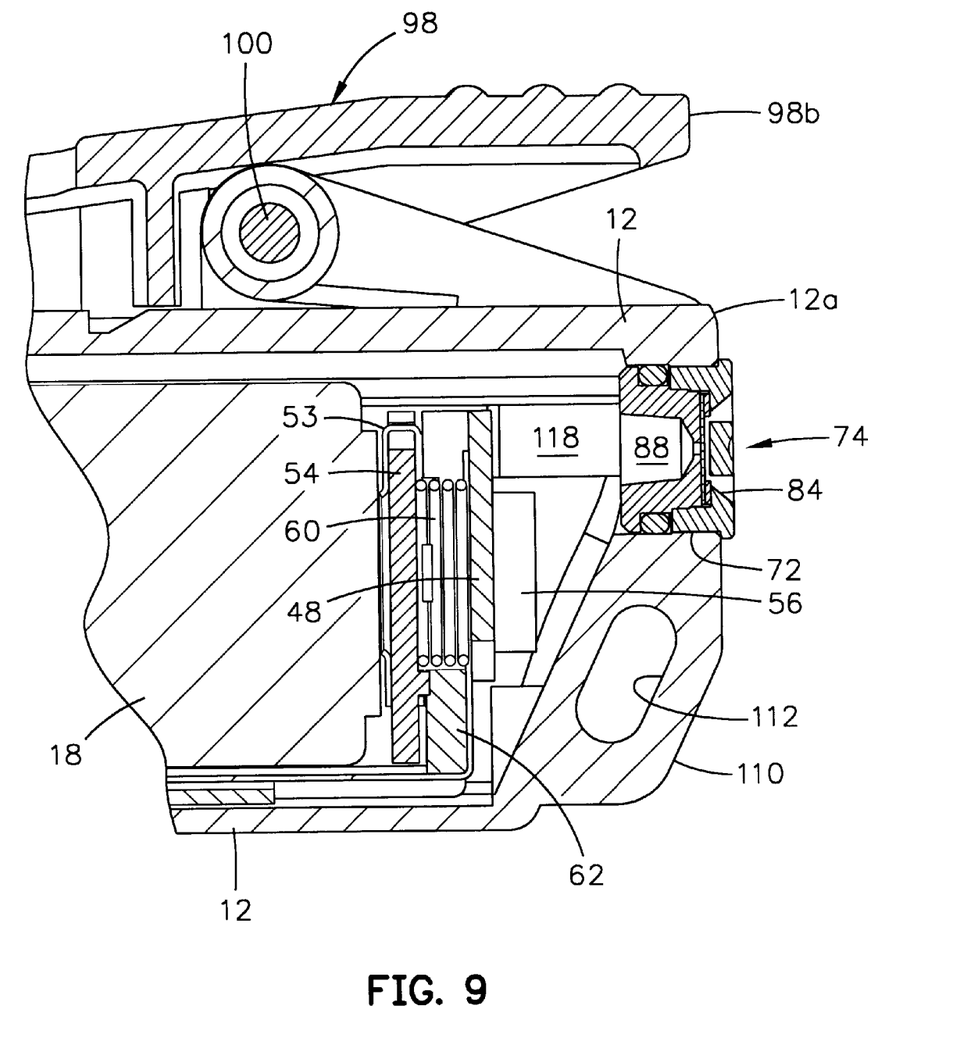
FIG. 9 is an enlarged fragmentary longitudinal sectional view of the rear end of the flashlight of FIG. 1 illustrating details of its gas venting membrane pill.

The rearmost negative contact member 53 is mounted on a sliding wall member 54 (FIG. 7) that is positioned within the battery carriage 20 at its rearmost end. The wall member 54 has a pair of rearwardly extending parallel flanges 56 (FIG. 8) that slide within vertical slots 58 (FIG. 12K) in the endwall 48 of the carriage 20. The wall member 54 is biased to an extended position away from the endwall 48 of the battery housing 12 by a coil spring 60 (FIG. 9). When both of the C cell batteries 16 and 18 are installed in their sub-compartment of the battery carriage 20 the wall member 54 is pushed rearwardly. A stop member 62 in the rear end of the battery carriage 20 limits the rearward movement of the wall member 54.

Figures 12A, 12B:
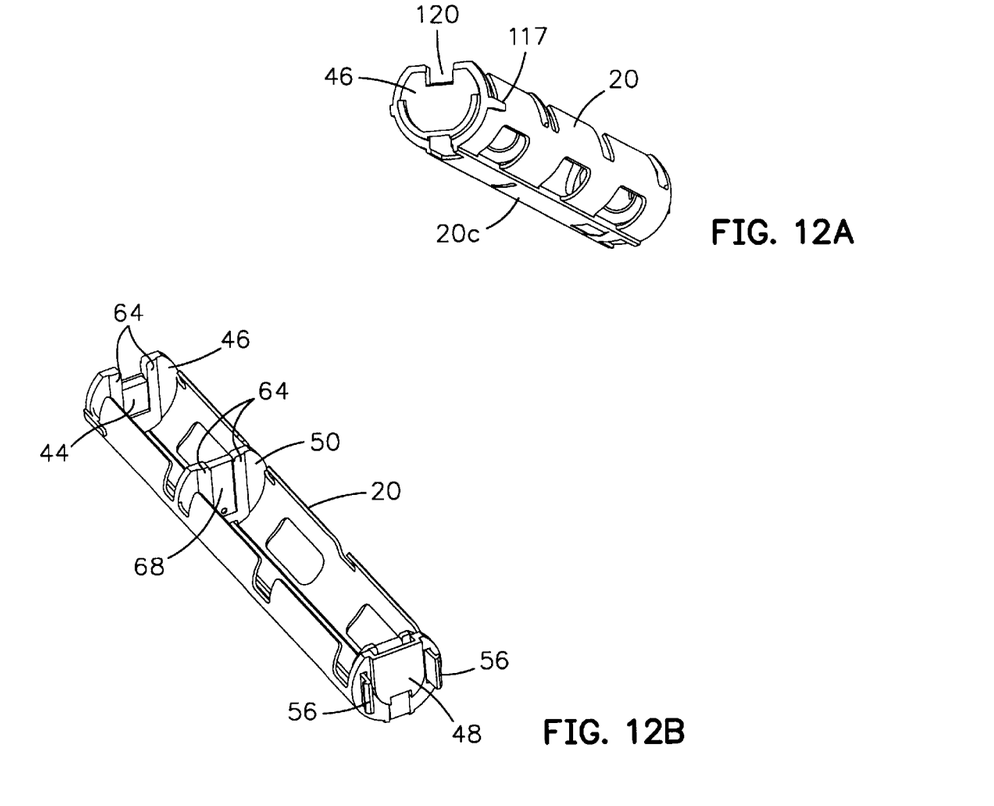
FIGS. 12A–12K are a series of isometric, elevation and end views showing all sides of the battery carriage of the flashlight of FIG. 1. Three C cell batteries are shown installed in the carriage in FIGS. 12G–12K.
Figure 12C:
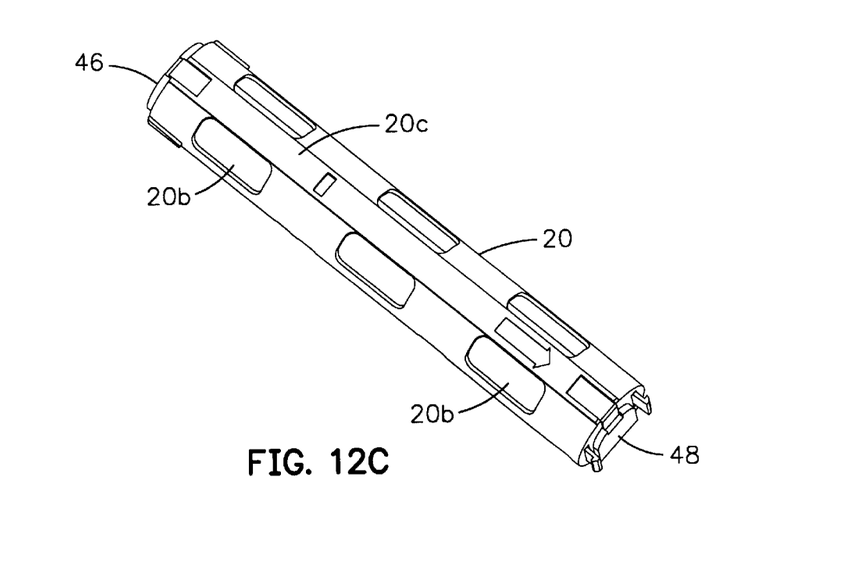
Figure 12D:
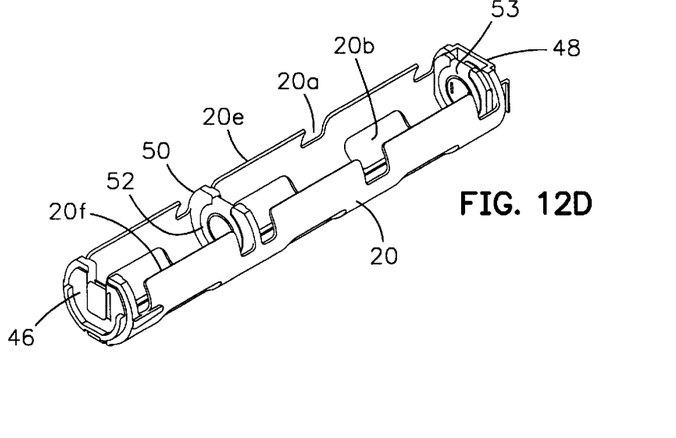

Referring to FIG. 12B, the endwall 46 and divider 50 of the battery carriage 20 are each provided with spacer elements in the form of vertical spaced apart parallel ribs 64. The ribs 64 allow the positive terminal of an adjacent C cell battery to contact the adjacent positive conductive contact members 44 and 68, respectively. The ribs 64 prevent the negative terminal of an adjacent C cell battery from contacting either of the conductive contact members 44 and 68 if the batteries are installed in an incorrect orientation, i.e. with an improper polarization.

The positive conductive contact member 44 is best seen in FIG. 17. It has a generally S-shaped configuration that wraps around the forward end wall 46 of the battery carriage 20 in position for contacting the rivet 40. A rear segment of the contact member 44 functions as a spring contact for the positive terminal of the forwardmost battery 14.

Figure 12E:
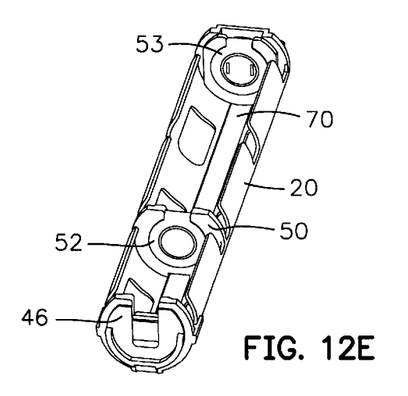
Figure 12F:
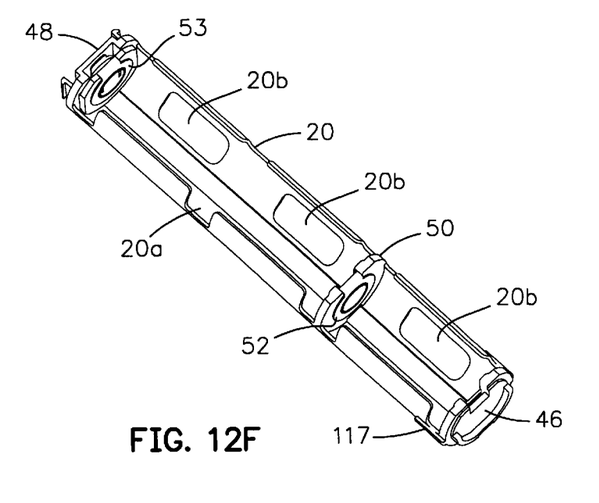
Figure 12G:
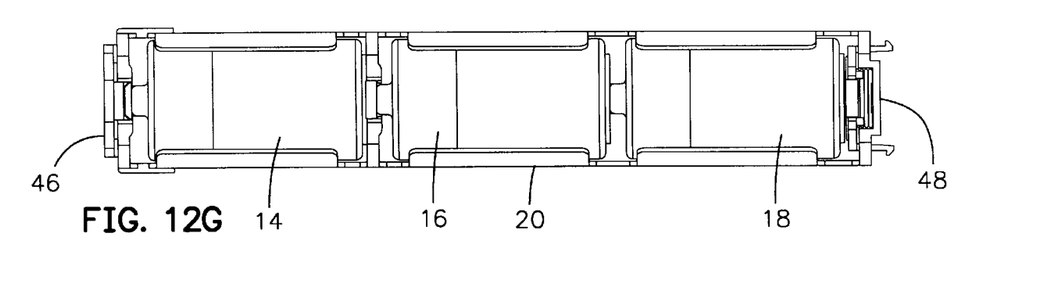
Figure 12H:
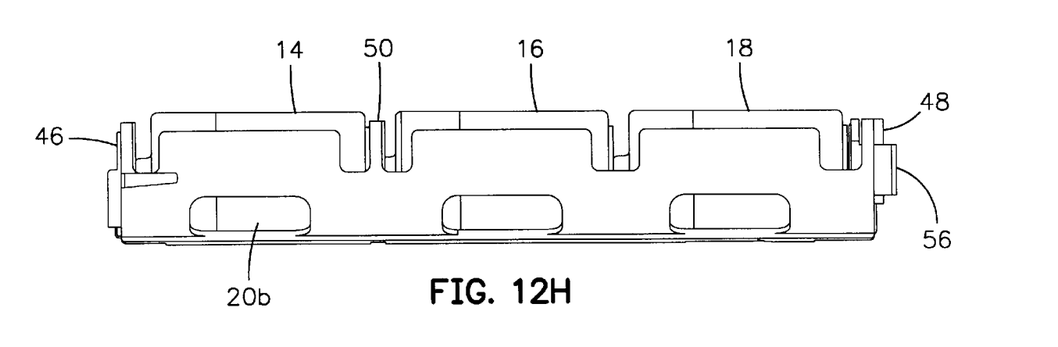
Figure 12I:
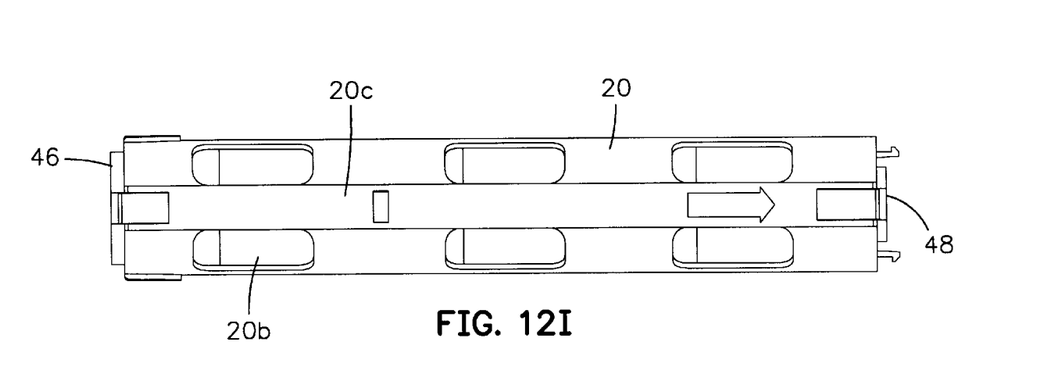
Figure 12J:
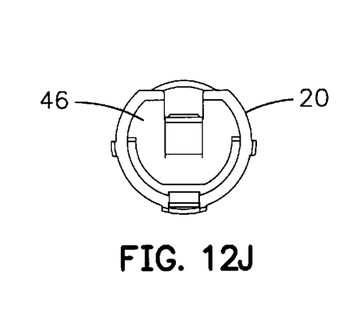
Figure 12K:
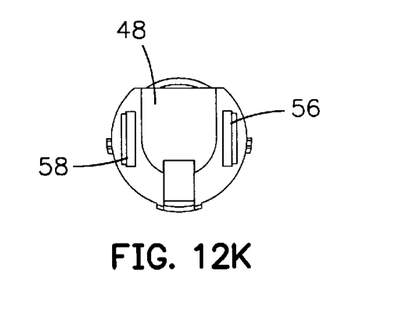

The positive conductive contact member 68 (FIG. 12B) is connected to the negative conductive contact member 52 (FIG. 12E). The contact members 52 and 68 may be made of a single piece of sheet metal folded so that it can grip the upper edge of the divider 50. The lower edge of the negative conductive contact member 52 may be provided with a bent tab (not illustrated) that fits into a slot (not illustrated) in the lower part of the divider 50 to hold the contact members 52 and 68 in position.

The negative conductive contact member 53 (FIG. 12E) is also preferably made of sheet metal and wraps around the movable wall member 54 at the rear end of the battery carriage 20. The conductive contact member 53 is connected to a long conductor 70 (FIG. 8) that extends substantially the entire length of the battery carriage 20 on top of the lower wall thereof as best seen in FIG. 12E. The conductor 70 extends through the slot (not illustrated) in the bottom of the divider 50 that holds the tab of the conduct contact member 52. A pad of dielectric insulative material (not illustrated) is preferably positioned between the long conductor 70 and this tab of the contact member 52 to prevent a short circuit. The conductor 70 connects with the conductive member 43 (FIGS. 8 and 17) that in turn makes electrical contact with the coil spring 42.

It will be understood that due to the configuration of the battery carriage 20 as described above, the batteries 16 and 18 will not even fit within their own sub-compartment if a user attempts to install them with their positive terminals in contact with each other. These two batteries will only fit in their two-thirds of the battery carriage 20 if they are installed with the positive terminal of one battery in contact with the negative terminal of the other. In order to complete the circuit and energize the bulb 24 by screwing down the barrel 32 the batteries 14, 16 and 18 must all be correctly polarized. The batteries 16 and 18 must be installed so that the positive terminal of the battery 16 engages the contact member 68 (FIG. 12B) and the negative terminal of the battery 18 engages the contact member 53 (FIG. 12E). The forward battery 14 must be installed so that its positive terminal engages the positive contact member 44 (FIG. 17). By ensuring correct polarization of the batteries the likelihood of corrosive chemicals and/or flammable gas being emitted by the batteries 14, 16 and 18 is reduced, in addition to conserving battery life.

Figure 10:
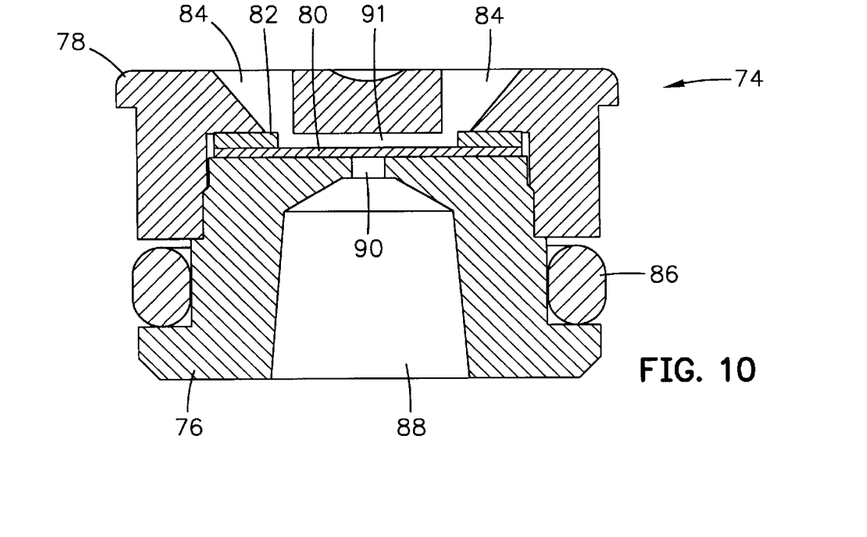
FIG. 10 is a greatly enlarged sectional view of the gas venting membrane pill shown in FIG. 9.
Figure 11:
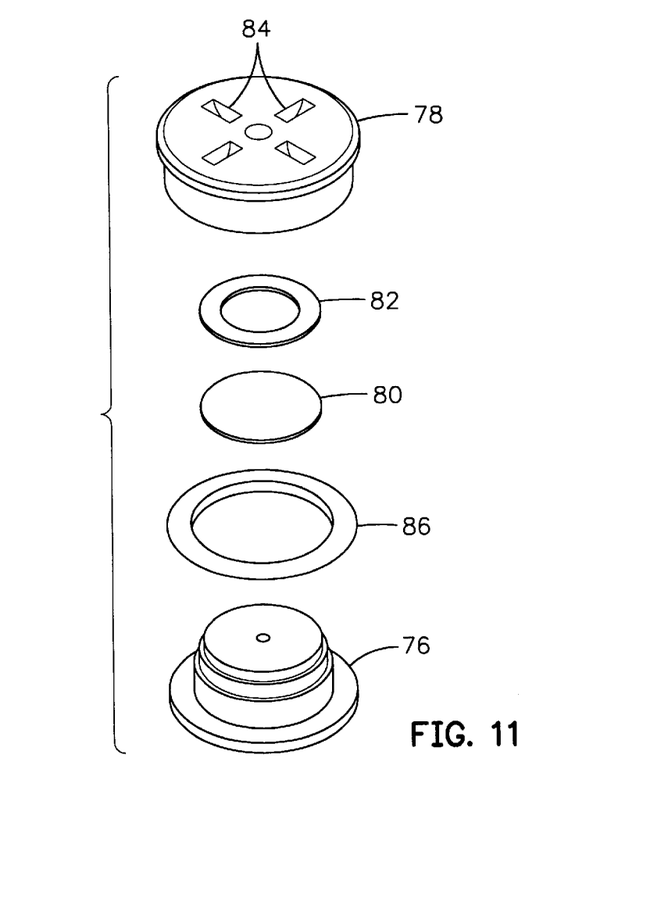
FIG. 11 is a slightly reduced exploded isometric view of the gas venting membrane pill of FIG. 10.

The flashlight 10 also incorporates a membrane that seals a vent port in the battery housing 12. The membrane is made of a material that permits a flammable gas generated by the batteries 14, 16 and 18 within the housing 20 to escape from the housing 20 through the membrane without permitting water to enter the housing through the membrane. Referring to FIG. 9, the housing 12 is formed with a stepped hole 72 in its rearward end wall 12a. This hole is designed to have a vent pill 74 (FIGS. 9, 10 and 11) press fit therein. The vent pill 74 has a generally cylindrical tapered plug 76 and a generally cylindrical tapered cap 78 that fits over the plug 76. A disk-shaped filter disk or membrane 80 and a ring-shaped peripheral sealing gasket 82 are sandwiched together and squeezed between the plug 76 and the cap 78. The cap 78 has four vent holes 84 therethrough. An O-ring 86 surrounds the plug 76 and provides a watertight seal between the vent pill 74 and the walls of the tapered hole 72 in the end wall 12a of the battery housing as shown in FIG. 9.

The plug 76 has a large central bore 88 (FIG. 10) that communicates through a small central bore 90 with the inside surface of the membrane 80. The outside surface of the membrane 80 communicates with a minute chamber 91 defined by spaced apart opposing surfaces of the plug 76 and cap 78. The vent holes 84 in the cap 78 communicate with the chamber 91. Hydrogen gas expelled by the batteries 14, 16 and 18 inside the battery housing 12 of the flashlight 10 can escape through the bores 88 and 90 into the chamber 91. From the chamber 91 the hydrogen gas escapes out into the ambient air through the vent holes 84. The gasket 82 is preferably made of an elastomer such as buna-n rubber The membrane 80 is preferably made of a material that is substantially impervious to liquid water but will allow flammable gas such as hydrogen to escape along with air through the membrane at minute pressure differentials relative to the ambient atmosphere. Even the plastic battery housing 12 will permit minute amounts of flammable gas to permeate through the sidewalls thereof although at a very slow rate over a twenty-four hour period. The rate of permeation of flammable gas solely through the walls of the housing 20 would be slow that a sufficient flammable gas could accumulate to present an explosion hazard. Therefore it is desirable to employ the vent pill 74 to vent the hydrogen gas. Preferably the disk-shaped membrane 80 has a diameter of less than one-half inch and is capable of venting at least 0.5 cubic centimeters of flammable gas per minute. In other words, the membrane 80 preferably has an area of less than 0.2 square inches and is capable of venting at least 0.5 cubic centimeters of flammable gas from the housing at sea level. Obviously the amount of gas that can be vented depends on the total area of the membrane 80. The membrane 80 cannot be so large as to take up an undue amount of surface area of the battery housing 12.

One material suitable for use as the membrane 80 is expanded polytetrafluroethylene ("PTFE") sold under the federally registered trademark GORE-TEX. Tests have indicated that a PTFE membrane having a diameter of 0.280 inches will yield a flow rate of approximately five cubic centimeters per minute in a flashlight of the type described when it is being used at sea level in the ambient air. Where the flashlight 10 is to be used for diving, the PTFE membrane 80 may be provided with a laminate backing such as polyester fabric for increased strength, i.e. so that it can withstand at least thirty PSI without rupturing.

As shown in FIGS. 1–5, the battery housing 12 is provided with a plurality of rectangular projections 92 and facets 94 on the exterior surface thereof. These are shaped and positioned so that they can be comfortably engaged by a user's thumb for achieving a sure grip. A transversely ribbed area 96 (FIG. 5) is also provided for engagement by the index finger of the user. A clip 98 (FIGS. 1, 2 and 4) is pivotally mounted to the upper side of the housing 12 with a shaft 100 (FIG. 8) and a torsion spring 102 to a pair of trunions 104 (FIG. 7) molded into the upper surface of the housing. The forward end 98a of the clip 98 is biased against the housing 12 by the torsion spring 102. The ribbed rearward end 98b of the clip 98 may be manually depressed to pivot the clip for attaching the flashlight 10 to a user's clothing. A plurality of grooves 105 (FIG. 7) are formed in the upper side of the housing 12 to enhance non-slip engagement with the user's clothing. The clip 98 has a series of rectangular apertures 106 and transversely extending ribs 108. A fin 110 (FIG. 9) extends from the rear endwall 12a of the battery housing. The fin 110 has a hole 112 therethrough for the attachment of a lanyard (not illustrated).

Figure 15:
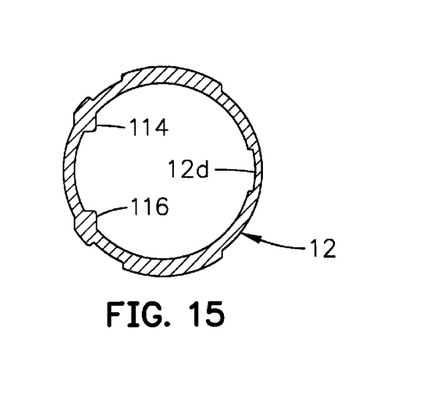
FIG. 15 is a cross-sectional view of the battery housing of the flashlight of FIG. 1 taken along line 15—15 of FIG. 13.
Figure 16:
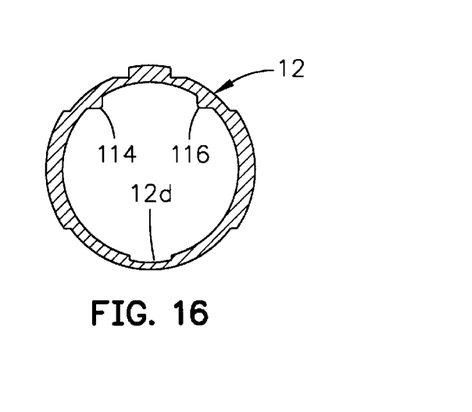
FIG. 16 is a cross-sectional view of the battery housing of the flashlight of FIG. 1 taken along line 16—16 of FIG. 14.

The interior wall of the housing 12 is formed with a longitudinally extending groove 12d (FIGS. 15 and 16) and a pair of spaced apart longitudinally extending rails 114 and 116. The groove 12d slidingly receives a spline or keel 20c (FIG. 12C) on the underside of the battery carriage 20. The rails 114 and 116 (FIGS. 15 and 16) engage and guide the upper edges 20e and 20f (FIG. 12D) of the battery carriage 20. This prevents rotation of the battery carriage 20 inside the battery housing 12 relative to their common cylindrical axis. Fins 117 (FIGS. 12A and 12F) project radially outwardly from opposite sides of the forward end of the battery carriage 20. They engage with slots 12g (FIG. 14) on the inside surface of the forward end of the housing 12 to prevent the battery carriage 20 from being fully inserted into the housing 12 in the wrong orientation. A passage 118 (FIG. 7) extends between the vent pill 74 and the interior of the battery housing 12. The passage 118 extends through a recess 120 (FIG. 12A) in the rear endwall 46 of the battery carriage 20. The prevention of rotation of the carriage 20 within the housing 20 leaves the passage 118 unobstructed.

Figures 21, 22:
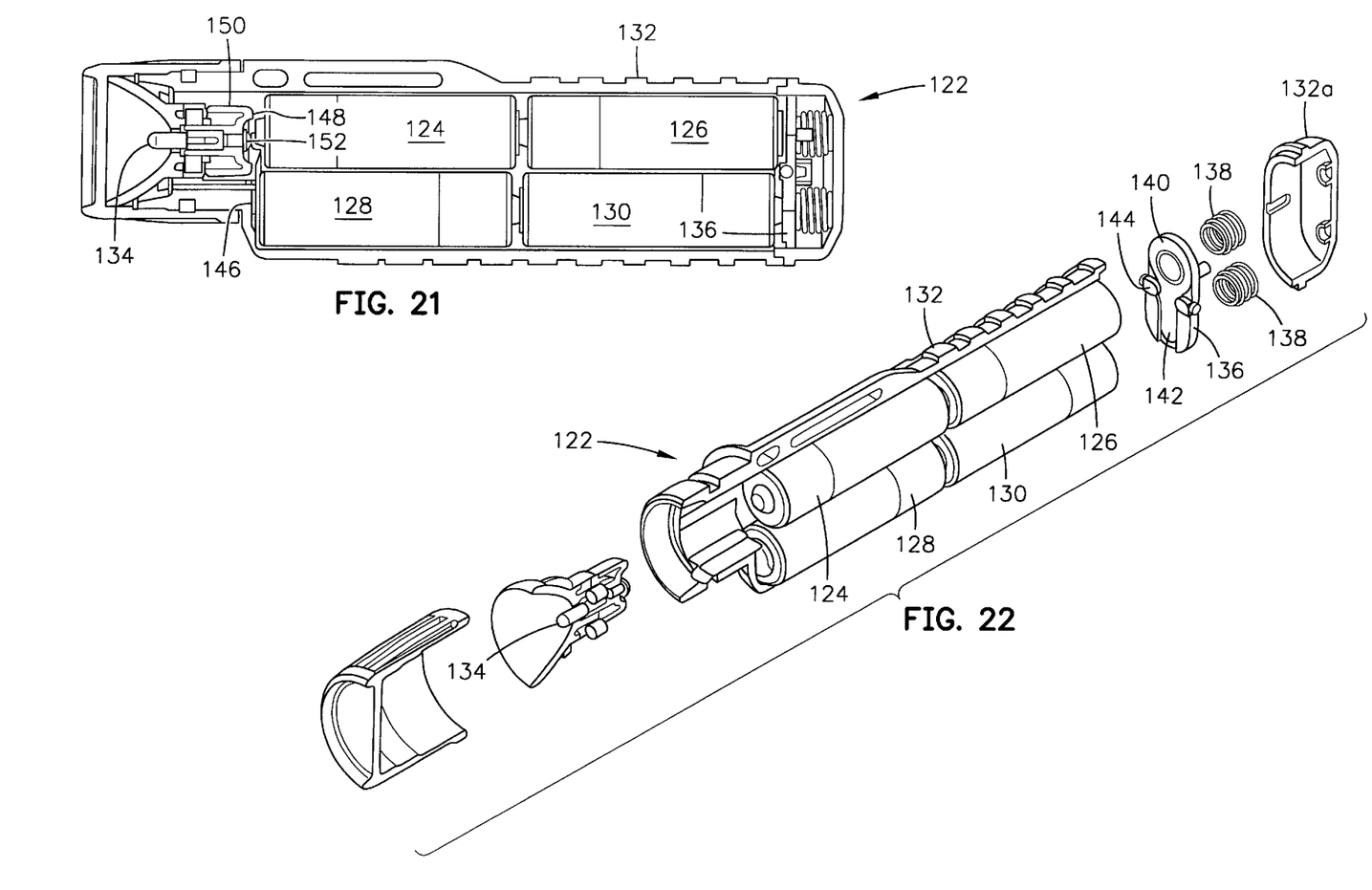
FIG. 21 is a longitudinal sectional view of a flashlight incorporating an alternate embodiment of the present invention.
FIG. 22 is an exploded isometric view of the flashlight of FIG. 21.

FIG. 21 is a longitudinal sectional view of a flashlight 122 incorporating an alternate embodiment of the present invention. FIG. 22 is an exploded isometric view of the flashlight 122 of FIG. 21. The flashlight 122 utilizes four AA size battery cells 124, 126, 128 and 130, arranged in two adjacent rows of two batteries each. The flashlight 112 includes a thin profile battery housing 132. The flashlight 122 is equipped with means for supporting the AA batteries so that only if the batteries are correctly polarized will a circuit be completed to allow current from the batteries to energize its bulb 134.

A rear wall member 136 (FIG. 22) of the flashlight 122 is slidable back and forth within the housing 132. This compresses a pair of coil springs 138 against the rear end cap 132a of the housing. A ring-shaped negative conductive contact member 140 is mounted on the upper inside surface of the wall member 136. The contact member 140 is integrally connected to a strip-shaped positive conductive contact member 142 mounted on the lower inside surface of the wall member 136.

Projections 144 (FIG. 22) on the inside surface of the wall member 136 prevent the negative terminal of an incorrectly oriented adjacent AA battery from making electrical contact with the positive conductive contact member 142.

A ring-shaped negative contact member 146 (FIG. 21) is mounted to the lower portion of the inside surface of a forward end wall of the housing 132. In addition, shoulders 148 are provided on the rear of a bulb socket assembly 150. The shoulders 148 only allow a positive terminal of the adjacent AA battery 124 to engage the rivet 152. The rivet 152 provides an electrical connection to the filament of the bulb 134.

While we have described two different embodiments of our flashlight, it should be understood that our invention may be modified in both arrangement and detail. For example, a flashlight could be made with the gas permeable membrane vent but without the battery polarization feature. A flashlight could also be made with the battery polarization feature, but without the gas permeable membrane vent. The catalyst pellets could be eliminated from the embodiment of FIGS. 1–20. The flashlight could utilize Lithium batteries instead of alkaline batteries in which case the membrane vent would be optimized for venting methane gas. The flow rate of the membrane vent could be varied, along with its configuration and placement on the housing. The membrane vent and the battery polarization features could be used alone or together in other portable electrical devices such as personal radios, tape players, CD players, televisions, video cameras, still digital cameras, and the like. Therefore the protection afforded our invention should only be limited in accordance with the scope of the following claims.

We claim:

1. A battery powered flashlight, comprising:
   a battery housing for holding a plurality of batteries each having positive and negative terminals;
   a bulb;
   socket means connected to the battery housing for holding the bulb;
   a reflector surrounding the bulb; and
   a carriage slidable into and out of the battery housing for supporting the batteries so that only if the batteries are correctly polarized will a circuit be completed to allow current from the batteries to energize the bulb.

2. A flashlight according to claim 1 wherein the carriage includes a plurality of negative conductive contact members configured so that they will not make electrical contact with a positive terminal of any of the plurality of batteries when they are fully inserted into the housing.

3. A flashlight according to claim 2 wherein each negative conductive contact member includes a ring-shaped element that will lie in substantially co-planar engagement with an adjacent negative terminal of one of the batteries but will surround and fail to contact an adjacent positive terminal of the one of the batteries.

4. A flashlight according to claim 3 wherein the carriage includes a plurality of positive conductive contact members for making electrical contact with an adjacent positive terminal of one of the batteries.

5. A flashlight according to claim 4 wherein the carriage further includes a plurality of spacer elements associated with the positive conductive contact members to prevent an adjacent negative terminal of a battery from making electrical contact with one of the positive conductive contact members.

6. A flashlight according to claim 1 wherein the battery housing is generally elongate and cylindrical in configuration and the carriage has a generally cylindrical elongate configuration with a plurality of outwardly opening sub-compartments defined by opposite end walls and at least one divider, the compartments being dimensioned for receiving cylindrical batteries and holding the batteries in end-to-end relationship.

7. A flashlight according to claim 1 wherein the socket means includes a cylindrical portion into which a base of the bulb is fit.

8. A flashlight according to claim 1 and further comprising at least one elongate conductor running from a rear end of the carriage to a forward end of the carriage substantially along an entire length of the carriage for providing an electrical connection to a terminal of a rearmost one of a plurality of cylindrical batteries supported in the carriage in end-to-end relationship.

9. A flashlight according to claim 8 and further comprising a cylindrical barrel twistable over a cylindrical forward neck of the battery housing, the barrel supporting a lens adjacent the bulb, and an ON/OFF switch actuated by rotating the barrel relative to the neck to make and break an electrical contact in a conductive path that includes the elongate conductor.

10. A flashlight according to claim 1 and further comprising a vent port assembly in the battery housing that permits a flammable gas generated by the batteries to exit the housing without permitting water to enter the housing.

11. A battery powered flashlight, comprising:

a battery housing for holding a plurality of batteries each having positive and negative terminals;

a bulb;

socket means connected to the battery housing for holding the bulb;

a reflector surrounding the bulb; and means mounted in the battery housing for supporting the batteries so that only if the batteries are correctly polarized will a circuit be completed to allow current from the batteries to energize the bulb, including a plurality of negative conductive contact members configured so that they will not make electrical contact with a positive terminal of any of the plurality of batteries when they are fully inserted into the housing.

12. A battery powered flashlight, comprising:

a battery housing having a hollow interior;

a bulb;

a reflector surrounding and supporting the bulb;

a cylindrical barrel twistable over a cylindrical forward neck of the battery housing, the barrel surrounding the reflector and supporting a lens adjacent the bulb;

a carriage slidable into and out of the hollow interior of the battery housing for supporting a plurality of batteries each having positive and negative terminals so that only if the batteries are correctly polarized can a circuit be completed to allow an electrical current from the batteries to energize the bulb; and an electrical circuit including an ON/OFF switch actuated by twisting the barrel for connecting the bulb to the batteries supported by the carriage for energizing and de-energizing the bulb.

13. A battery powered flashlight, comprising:

a generally elongate cylindrical battery housing;

a bulb;

a reflector surrounding and supporting the bulb;

a cylindrical barrel twistable over a cylindrical forward neck of the battery housing, the barrel surrounding the reflector and supporting a lens adjacent the bulb;

an elongated carriage slidable into and out of the battery housing for supporting a plurality of generally cylindrical batteries so that only if the batteries are correctly polarized can a circuit be completed to allow current from the batteries to energize the bulb, the carriage having plurality of sub-compartments defined by opposite end walls and at least one divider, the compartments being dimensioned for receiving and holding the batteries in an end-to-end relationship, the carriage further having at least one elongate conductor running between the end walls of the carriage substantially along an entire length of the carriage for providing an electrical connection to a terminal of a rearmost one of the batteries; and an ON/OFF switch actuated by rotating the barrel relative to the neck to make and break an electrical contact in a conductive path that includes the elongate conductor rug between the end walls of the carriage.

14. A flashlight according to claim 13 and further comprising a vent port assembly in the battery housing that permits a flammable gas generated by the batteries to exit the housing without permitting water to enter the housing.

15. A flashlight according to claim 13 and further comprising an elastomeric O-ring surrounding the neck for providing a watertight seal between the barrel and the neck of the housing.

16. A flashlight according to claim 13 wherein the divider is configured to provide an electrical connection only between a negative terminal and a positive terminal of an adjacent set of ends of a pair of the batteries.

17. A battery powered flashlight, comprising:

an elongate tubular battery housing defining a hollow interior and having a closed rearward end and a forward open end;

a bulb;

a reflector surrounding and supporting the bulb;

a cylindrical barrel threadable over a cylindrical forward neck at the open end of the battery housing to seal the interior in a watertight fashion, the barrel surrounding the reflector;

an elongated carriage slidable into and out of the interior of the battery housing through the open end for supporting a plurality of generally cylindrical batteries in an end-to-end series relationship, the carriage having at least one elongate conductor running substantially along an entire length of the carriage for providing an electrical connection to a terminal of a rearmost one of the batteries; and the barrel and neck being configured so that by rotating the barrel a circuit including the bulb, the batteries and the elongate conductor can be made and broken to energize and de-energize the bulb, respectively.

18. A flashlight according to claim 17 wherein the tubular battery housing and the carriage are configured to prevent the carriage from being fully inserted into the battery housing in a wrong orientation.

* * * * *

UNITED STATES PATENT AND TRADEMARK OFFICE
CERTIFICATE OF CORRECTION

PATENT NO. : 5,904,414
DATED : May 18, 1999
INVENTOR(S) : William J. Monteleone et al.

It is certified that error appears in the above-identified patent and that said Letters Patent is hereby corrected as shown below:

Column 10, line 24, change "rug" to -- running --.

Signed and Sealed this

Seventh Day of September, 1999

Attest:

Q. TODD DICKINSON

*Attesting Officer*      *Acting Commissioner of Patents and Trademarks*